(12) United States Patent
Kang et al.

(10) Patent No.: US 12,482,813 B2
(45) Date of Patent: Nov. 25, 2025

(54) CATHODE FOR LITHIUM SECONDARY BATTERY AND LITHIUM SECONDARY BATTERY INCLUDING THE SAME

(71) Applicant: SK ON CO., LTD., Seoul (KR)

(72) Inventors: Min Gu Kang, Daejeon (KR); Sang Han Lee, Daejeon (KR); Yong Hyun Cho, Daejeon (KR)

(73) Assignee: SK On Co., Ltd., Seoul (KR)

(*) Notice: Subject to any disclaimer, the term of this patent is extended or adjusted under 35 U.S.C. 154(b) by 640 days.

(21) Appl. No.: 17/671,706

(22) Filed: Feb. 15, 2022

(65) Prior Publication Data

US 2022/0263078 A1 Aug. 18, 2022

(30) Foreign Application Priority Data

Feb. 16, 2021 (KR) .................. 10-2021-0020435

(51) Int. Cl.
| | |
|---|---|
| H01M 4/36 | (2006.01) |
| H01M 4/02 | (2006.01) |
| H01M 4/505 | (2010.01) |
| H01M 4/525 | (2010.01) |
| H01M 10/0525 | (2010.01) |

(52) U.S. Cl.
CPC .......... *H01M 4/366* (2013.01); *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
CPC ...... H01M 4/366; H01M 4/505; H01M 4/525; H01M 4/131; H01M 4/362; H01M 4/13; H01M 4/36; H01M 4/02; H01M 10/0525; H01M 10/052; H01M 2004/021; H01M 2004/028

See application file for complete search history.

(56) References Cited

U.S. PATENT DOCUMENTS

| | | | |
|---|---|---|---|
| 10,897,038 B2 | 1/2021 | Kim | |
| 2010/0209763 A1* | 8/2010 | Okamura | ............... H01M 4/139 |
| | | | 429/223 |
| 2011/0168550 A1* | 7/2011 | Wang | .................... H01M 4/131 |
| | | | 204/290.01 |
| 2018/0145323 A1* | 5/2018 | Yoo | ................... H01M 50/1245 |

(Continued)

FOREIGN PATENT DOCUMENTS

| | | |
|---|---|---|
| EP | 3764438 A1 | 1/2021 |
| KR | 1020170093085 A | 8/2017 |

(Continued)

*Primary Examiner* — Adam J Francis
(74) *Attorney, Agent, or Firm* — The Webb Law Firm

(57) ABSTRACT

A cathode for a lithium secondary battery includes a cathode current collector, and a cathode active material layer including a first cathode active material layer and a second cathode active material layer sequentially stacked on the cathode current collector. The first cathode active material layer includes first cathode active material particles having a secondary particle structure, and the second cathode active material layer includes second cathode active material particles having a single particle shape. A ratio of a SPAN value of the second cathode active material particles relative to a SPAN value of the first cathode active material particles is in a range from 2 to 4.5.

9 Claims, 4 Drawing Sheets

(56) References Cited

U.S. PATENT DOCUMENTS

| | | | |
|---|---|---|---|
| 2020/0067082 A1* | 2/2020 | Nozoe | H01M 4/1397 |
| 2020/0403228 A1* | 12/2020 | Kim | C01G 53/00 |
| 2022/0293930 A1* | 9/2022 | Ryu | H01M 10/0525 |
| 2023/0111642 A1* | 4/2023 | Wu | H01M 4/587 |
| | | | 429/213 |

FOREIGN PATENT DOCUMENTS

| | | | | |
|---|---|---|---|---|
| WO | 2014090584 A1 | | 6/2014 | |
| WO | WO-2019166930 A1 | * | 9/2019 | C01G 51/06 |

* cited by examiner

CATHODE FOR LITHIUM SECONDARY BATTERY AND LITHIUM SECONDARY BATTERY INCLUDING THE SAME

CROSS-REFERENCE TO RELATED APPLICATION

This application claims priority to Korean Patent Application No. 10-2021-0020435 filed Feb. 16, 2021, the disclosure of which is hereby incorporated by reference in its entirety.

BACKGROUND OF THE INVENTION

1. Field of the Invention

The present invention relates to a cathode for a lithium secondary battery and a lithium secondary battery including the same. More particularly, the present invention relates to a cathode for a lithium secondary battery including a lithium metal oxide-based cathode active material, and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle such as a hybrid automobile.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape.

A lithium metal oxide may be used as a cathode active material of the lithium secondary battery preferably having high capacity, power and life-span. However, as an application range of the lithium secondary battery has been expanded, stability in a harsh environment such as high temperature or low temperature environment is further required. For example, when the lithium secondary battery or the cathode active material is designed for high capacity, cell stability at high temperature may be deteriorated, and life-span properties of the battery may also be deteriorated. For example, Korean Publication of Patent Application No. 10-2017-0093085 discloses a cathode active material including a transition metal compound and an ion adsorbing binder, which may not provide sufficient life-span and stability.

SUMMARY OF THE INVENTION

According to an aspect of the present invention, there is provided a cathode for a lithium secondary battery having improved operational stability and reliability.

According to exemplary embodiments, there is provided a lithium secondary battery including a cathode having improved operational stability and reliability.

According to exemplary embodiments, a cathode for a lithium secondary battery includes a cathode current collector, and a cathode active material layer including a first cathode active material layer and a second cathode active material layer sequentially stacked on the cathode current collector. The first cathode active material layer includes first cathode active material particles having a secondary particle structure, and the second cathode active material layer includes second cathode active material particles having a single particle shape. A ratio of a SPAN value defined as Equation 1 of the second cathode active material particles relative to a SPAN value defined as Equation 1 of the first cathode active material particles is in a range from 2 to 4.5.

$$\text{SPAN} = (D90 - D10)/D50 \quad \text{[Equation 1]}$$

In Equation 1, D10, D50 and D90 are particle diameters at cumulative volume percents of 10%, 50% and 90%, respectively, in a cumulative volume particle diameter distribution.

In some embodiments, the ratio of the SPAN value of the second cathode active material particles relative to the SPAN value of the first cathode active material particles may be in a range from 2 to 3.5

In some embodiments, the SPAN value of the second cathode active material particles may be in a range from 0.7 to 2, and the SPAN value of the first cathode active material particles may be less than 1.

In some embodiments, the SPAN value of the second cathode active material particles may be in a range from 0.9 to 1.7, and the SPAN value of the first cathode active material particles may be in a range from 0.3 to 0.6.

In some embodiments, each of the first cathode active material particles and the second cathode active material particles may include a lithium metal oxide containing nickel, and a content of nickel included in the first cathode active material particles may be greater than or equal to a content of nickel included in the second cathode active material particles.

In some embodiments, each of the first cathode active material particles and the second cathode active material particles may further contain cobalt and manganese, a molar ratio of nickel among nickel, cobalt and manganese in the first cathode active material particles may be 0.6 or more, and a molar ratio of nickel among nickel, cobalt and manganese in the second cathode active material particles may be 0.5 or more.

In some embodiments, the molar ratio of nickel among nickel, cobalt and manganese in the first cathode active material particles may be 0.8 or more, and the molar ratio of nickel among nickel, cobalt and manganese in the second cathode active material particles may be 0.6 or more.

In some embodiments, the first cathode active material particles may include a concentration non-uniformity region of at least one element of nickel, cobalt and manganese between a central portion and a surface portion.

In some embodiments, each of nickel, cobalt and manganese contained in the second cathode active material particles may not form a concentration gradient.

In some embodiments, an average particle diameter of the second cathode active material particles may be smaller than an average particle diameter of the first cathode active material particles.

In some embodiments, a thickness of the second cathode active material layer may be smaller than a thickness of the first cathode active material layer.

According to exemplary embodiments, a lithium secondary battery includes a case, and an electrode assembly accommodated in the case. The electrode assembly includes an anode and the cathode for a lithium secondary battery according to embodiments as described above facing the anode.

A lithium secondary battery according to exemplary embodiments may include a cathode active material layer having a multi-layered structure. The cathode active material layer may include a first cathode active material layer including a cathode active material particle having a secondary particle structure, and a second cathode active material layer including a cathode active material particle having a single particle shape.

The first cathode active material layer may be disposed to be adjacent to a current collector to realize high-power and high-capacity properties, and the second cathode active material layer may be disposed at an outer portion of the cathode to improve thermal stability and penetration stability.

In exemplary embodiments, a ratio of a SPAN value of the first cathode active material particles included in the first cathode active material layer and a SPAN value of the second cathode active material particles included in the second cathode active material layer may be adjusted, so that particle cracks generated during an electrode pressing process may be effectively prevented. Accordingly, gas generation due to a side reaction caused when high-temperature charging/discharging may be repeated may be suppressed to remarkably improve life-span properties of the secondary battery.

DESCRIPTION OF THE INVENTION

According to exemplary embodiments of the present invention, a cathode for a secondary battery including a multi-layered structure of a first cathode active material layer and a second cathode active material layer that may include different cathode active material particles is provided. Further, a lithium secondary battery including the cathode and having improved power and stability is also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "first" and "second" are used herein not to limit the number or the order of elements or objects, but to relatively designate different elements.

Figure 1:
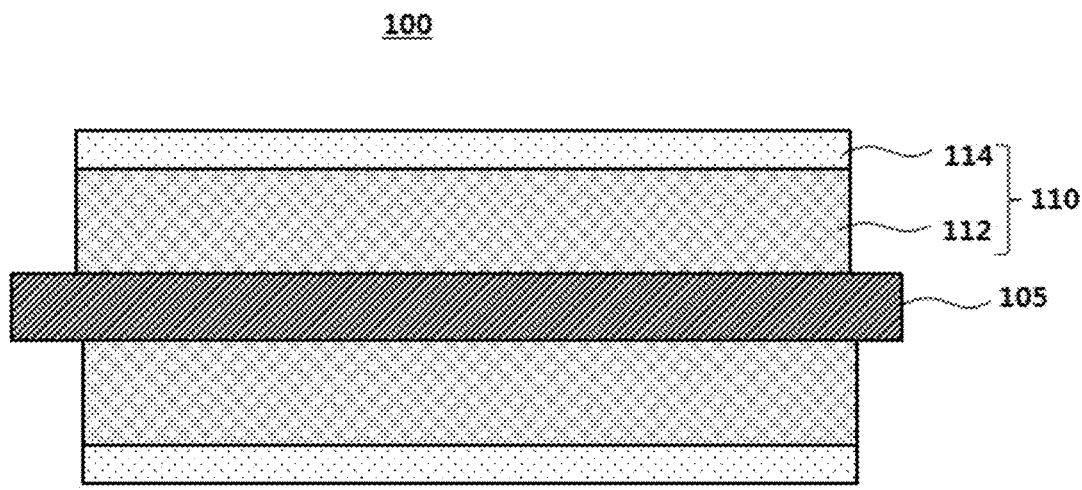
FIG. 1 is a schematic cross-sectional view illustrating a cathode for a lithium secondary battery in accordance with exemplary embodiments.

FIG. 1 is a schematic cross-sectional view illustrating a cathode for a lithium secondary battery in accordance with exemplary embodiments.

Referring to FIG. 1, a cathode 100 may include a cathode active material layer 110 formed on at least one surface of a cathode current collector 105. The cathode active material layer 110 may be formed on both surfaces (e.g., upper and lower surfaces) of the cathode current collector 105.

The cathode current collector 105 may include, e.g., stainless steel, nickel, aluminum, titanium, copper or an alloy thereof, and may preferably include aluminum or an aluminum alloy.

In exemplary embodiments, the cathode active material layer 110 may include a first cathode active material layer 112 and a second cathode active material layer 114. Accordingly, the cathode active material layer 110 may have a multi-layered structure (e.g., a double-layered structure) in which a plurality of cathode active material layers are stacked.

The first cathode active material layer 112 may be formed on a surface of the cathode current collector 105. For example, the first cathode active material layer 112 may be formed on each of the upper and lower surfaces of the cathode current collector 105. As illustrated in FIG. 1, the first cathode active material layer 112 may directly contact the surface of the cathode current collector.

The first cathode active material layer 112 may include a first cathode active material particle. The first cathode active material particle may include a lithium metal oxide containing nickel and another transition metal. In exemplary embodiments, in the first cathode active material particle, nickel may be included in the highest content (molar ratio) among metals other than lithium, and the content of nickel among the metals other than lithium may be about 60 mol % or more.

In some embodiments, the first cathode active material particle may be represented by the following Chemical Formula 1.

    [Chemical Formula 1]

In Chemical Formula 1, M1 and M2 may each include at least one of Co, Mn, Na, Mg, Ca, Ti, V, Cr, Cu, Zn, Ge, Sr, Ag, Ba, Zr, Nb, Mo, Al, Ga, W, Y or B, and $0<x\leq1.2$, $2\leq y\leq2.02$, $0.6\leq a\leq0.99$, $0.01\leq b+c\leq0.4$.

In some embodiments, the first cathode active material particle may further include at least one of cobalt (Co) and manganese (Mn). In an embodiment, M1 and M2 in Chemical Formula 1 may include cobalt (Co) and manganese (Mn), respectively.

For example, nickel may serve as a metal associated with power and/or capacity of a lithium secondary battery. As described above, the lithium metal oxide having a nickel content of 0.6 or more may be employed as the first cathode active material particle, and the first cathode active material layer 112 may be formed to be in contact with the cathode current collector 105, so that high power and high capacity may be efficiently implemented from the cathode 100.

For example, manganese (Mn) may serve as a metal related to mechanical and electrical stability of the lithium secondary battery. For example, cobalt (Co) may serve as a metal related to conductivity, resistance or power of the lithium secondary battery.

In a preferable embodiment, $0.7\leq a\leq0.99$ and $0.01\leq b+c\leq0.3$ in consideration of achieving high power/capacity from the first cathode active material layer 112.

In an embodiment, in the first cathode active material particle, the content (molar ratio) of nickel may be about 0.8 or more. For example, the concentration ratio (molar ratio) of nickel:cobalt:manganese may be adjusted as about 8:1:1. In this case, conductivity and life-span properties may be supplemented by including cobalt and manganese in substantially equal amounts while increasing capacity and power through nickel of about 0.8 molar ratio.

In some embodiments, the first cathode active material particle may include a concentration non-uniformity region. For example, the metal element other than lithium included in the first cathode active material particle may have a local concentration non-uniformity or a local concentration difference. For example, the metal element may include a concentration non-uniformity region or a concentration gradient region. For example, the first cathode active material particle may include the lithium metal oxide in which a concentration gradient region or a concentration non-uniformity region of at least one metal is formed.

In some embodiments, the first cathode active material particle may include a concentration non-uniformity region between a central portion and a surface portion. For example, the first cathode active material particle may include a core region and a shell region, and the concentration non-uniformity region may be included between the core region and the shell region. The concentration may be constant or fixed in the core region and the shell region.

In an embodiment, the concentration non-uniformity region may be formed at the central portion. In an embodiment, the concentration non-uniformity region may be formed at the surface portion.

In some embodiments, the first cathode active material particle may include the lithium metal oxide having a continuous concentration gradient from a center of the particle to a surface of the particle. For example, the first cathode active material particle may have a full concentration gradient (FCG) structure having a substantially entire concentration gradient throughout the particle.

The term "continuous concentration gradient" used herein may indicate a concentration profile which may be changed with a certain trend or tendency between the center and the surface. The certain trend may include an increasing trend or a decreasing trend.

The term "central portion" used herein may include a central point of the active material particle and may also include a region within a predetermined radius from the central point. For example, "central portion" may encompass a region within a radius of about 0.1 µm, 0.2 µm, 0.3 µm or 0.4 µm from the central point of the active material particle.

The term "surface portion" used herein may include an outermost surface of the active material particle, and may also include a predetermined thickness from the outermost surface. For example, "surface portion" may include a region within a thickness of about 0.1 µm, 0.05 µm or 0.01 µm from the outermost surface of the active material particle.

In some embodiments, the concentration gradient may include a linear concentration profile or a curved concentration profile. In the curved concentration profile, the concentration may change in a uniform trend without any inflection point.

In an embodiment, at least one metal except for lithium included in the first cathode active material particle may have an increasing continuous concentration gradient, and at least one metal except for lithium included in the first cathode active material particle may have a decreasing continuous concentration gradient.

In an embodiment, at least one metal included in the first cathode active material particle except for lithium may have a substantially constant concentration from the central portion to the surface.

When the first cathode active material particle includes the concentration non-uniformity region, the concentration (or the molar ratio) of Ni may be continuously decreased from the central portion to the surface or in the concentration non-uniformity region. For example, the concentration of Ni may be decreased in a direction from the central portion to the surface within a range between about 0.99 and about 0.6. In an embodiment, the concentration of Ni may be decreased in the direction from the central portion to the surface within a range between about 0.99 and about 0.7, e.g., between 0.9 and 0.7.

In a case that M1 and M2 in Chemical Formula 1 are cobalt and manganese, respectively, a concentration of manganese may increase from the central portion to the surface, or in the concentration non-uniformity region. The content of manganese may be increased in a direction to the surface of the particle, so that defects such as ignition and short circuit due to a penetration occurring through the surface of the first cathode active material particle may be suppressed or reduced to increase life-span of the lithium secondary battery.

In an embodiment, a concentration of cobalt may be fixed or constant throughout an substantially entire region of the first cathode active material particle. Thus, improved conductivity and low resistance may be achieved while constantly maintaining a flow of current and charge through the first cathode active material particle.

In an embodiment, when M1 and M2 in Chemical Formula 1 are cobalt and manganese, respectively, the concentration of cobalt may increase in the direction to the surface in the concentration non-uniformity region. In this case, the concentration of manganese may be fixed or constant throughout substantially the entire region of the first cathode active material particle. Thus, chemical and thermal stability may be maintained throughout the entire region of the first cathode active material particle. For example, the concentration of cobalt may be increased at the surface of the particle to improve power and conductivity at the surface portion.

For example, when the molar ratio of nickel:cobalt:manganese in the first cathode active material particle is adjusted to about 8:1:1 and the first cathode active material particle includes the concentration gradient, an overall average concentration in the particle may be about 8:1:1.

In exemplary embodiments, the first cathode active material particle may have a structure or a shape of a secondary particle in which a plurality of primary particles (e.g., 20 or more, 30 or more, 50 or more, or 100 or more, etc.) are aggregated or assembled.

In this case, the first cathode active material particle may be formed through a co-precipitation method of a metal precursor. For example, metal precursor solutions having different concentrations may be prepared. The metal precursor solutions may include precursors of metals to be included in the cathode active material. For example, the metal precursors may be a halide, hydroxide or an acid salt of the metals.

For example, the metal precursors may include a lithium precursor (e.g., lithium hydroxide, lithium oxide), a nickel precursor, a manganese precursor and a cobalt precursor.

In exemplary embodiments, a first precursor solution having a target composition at the central portion (e.g., concentrations of nickel, manganese and cobalt at the central portion) of the first cathode active material particle and a second precursor solution having a target composition at the surface (e.g., concentrations of nickel, manganese and cobalt at the surface) of the first cathode active material particle may each be prepared.

Thereafter, a precipitate may be formed while mixing the first and second precursor solutions. During the mixing, a mixing ratio may be continuously changed so that a concentration gradient is continuously formed from the target composition at the central portion to the target composition at the surface. Accordingly, primary particles of varying concentrations may be precipitated and aggregated to generate secondary particles having a concentration gradient within the particle. Accordingly, the structure of the first cathode active material particle including the above-described concentration gradient may be easily obtained.

In some embodiments, the precipitate may be formed by adding a chelating agent and a basic agent during the mixing. In some embodiments, the precipitated may be heat-treated, and then may be mixed with the lithium precursor and heat-treated again.

In some embodiments, the first cathode active material particle may be prepared by a solid phase mixing/reaction, and a method of preparing the first cathode active material particle is not be limited to the solution-based process as described above.

The first cathode active material particle may be mixed and stirred together with a binder, a conductive material and/or a dispersing agent in a solvent to form a first slurry. The first slurry may be coated on the cathode current collector 105, and dried and pressed to obtain the first cathode active material layer 112.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the first cathode active material layer 112 may be reduced, and an amount of the first cathode active material particles may be relatively increased. Thus, capacity and power of the lithium secondary battery may be further improved.

The conductive material may be added to facilitate electron mobility between the active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The second cathode active material layer 114 may be formed on the first cathode active material layer 112. As illustrated in FIG. 1, the second cathode active material layer 114 may be directly formed on an upper surface of the first cathode active material layer 112, and may serve as a coating layer of the cathode 100.

The second cathode active material layer 114 may include second cathode active material particles. The second cathode active material particle may include a lithium metal oxide containing nickel, cobalt and another transition metal.

In exemplary embodiments, each of the second cathode active material particles may have a single particle shape. The term "single particle shape" herein may be used to exclude a secondary particle in which a plurality of primary particles are agglomerated. For example, the second cathode active material particle may substantially consist of particles having the single particle shape, and the second particle structure having primary particles agglomerated or assembled therein may be excluded.

The term "single particle shape" herein may not exclude a monolithic shape in which several (e.g., less than 20 or less than 10) independent particles are adjacent or attached to each other.

In some embodiments, the second cathode active material particle may include a structure in which a plurality of primary particles are integrally merged to be converted into a substantially single particle.

For example, the second cathode active material particle may have a granular single particle shape or a spherical single particle shape.

In exemplary embodiments, the second cathode active material particle may have a substantially constant or fixed concentration throughout an entire region of the particle. For example, concentrations of metals except for lithium may be substantially fixed or constant from a central portion of the particle to a surface of the particle in the second cathode active material particle.

In some embodiments, the second cathode active material particle may include nickel (Ni), cobalt (Co) and manganese (Mn). As described above, concentrations or molar ratios of Ni, Co and Mn may be substantially constant or fixed throughout the entire region of the second cathode active material particle. For example, Ni, Co and Mn may not form a concentration gradient in the second cathode active material particle.

In some embodiments, a concentration of nickel in the second cathode active material particle may be equal to or less than a concentration of nickel in the first cathode active material particle. In a preferable embodiment, the concentration of nickel in the second cathode active material particle may be less than a concentration of nickel in the first cathode active material particle.

In an embodiment, the concentration of nickel in the second cathode active material particle may be fixed to be equal to or less than the concentration of nickel at the surface of the first cathode active material particle, preferably less than the concentration of nickel at the surface of the first cathode active material particle.

In some embodiments, the concentration of nickel in the second cathode active material particle may be equal to or more than the concentration of nickel in the first cathode active material particle.

In some embodiments, a molar ratio of Ni among metals except for lithium in the second cathode active material particle may be in a range from about 30% to about 99%. Within this range, sufficient thermal and penetration stability may be obtained from the second cathode active material layer 114 without degrading capacity/power of the cathode 100.

In a preferable embodiment, the molar ratio of Ni among metals except for lithium in the second cathode active material particle may be 50% or more, e.g., in a range from 50% to 99%.

In an embodiment, the molar ratio of Ni among metals except for lithium in the second cathode active material particle may be 60% or more, 70% or more or 80% or more.

In an embodiment, the molar ratios of Ni among metals except for lithium in the first cathode active material particle and the second cathode active material particle may each be 80% or more.

In some embodiments, the second cathode active material particle may include a lithium metal oxide represented by the following Chemical Formula 2.

$$Li_xNi_aCo_bMn_cM4_dM5_eO_y \quad \text{[Chemical Formula 2]}$$

In the Chemical Formula 2 above, M4 may include at least one element selected from Ti, Zr, Al, Mg, Si, B, Na, V, Cu, Zn, Ge, Ag, Ba, Nb, Ga or Cr. M5 may include at least one element selected from Sr, Y, W or Mo. In Chemical Formula 2, $0.9<x<1.3$, $2\le y\le 2.02$, $0.313\le a\le 0.99$, $0.045\le b\le 0.353$, $0.045\le c\le 0.353$ and $0.98\le a+b+c+d+e\le 1.03$.

As represented by Chemical Formula 2, in consideration of both capacity and stability of the lithium secondary battery, an amount of Ni may be the largest of those of the metals except for lithium in the second cathode active material particle, and the molar ratio of Ni in the second cathode active material particle may be less than that in the first cathode active material particle In some embodiments, the second cathode active material particle may be prepared by a solid-state thermal treatment of the metal precursors. For example, the lithium precursor, the nickel precursor, the manganese precursor and the cobalt precursor may be mixed according to the composition of the Chemical Formula 2 above to form a precursor powder.

The precursor powder may be thermally treated in a furnace at, e.g., a temperature from about 700° C. to about 1200° C., and the precursors may be merged or fused into a substantially single particle shape to obtain the second cathode active material particle having the single particle shape. The thermal treatment may be performed under an air atmosphere or an oxygen atmosphere so that the second cathode active material particle may be formed as a lithium metal oxide.

Within the above temperature range, generation of secondary particles may be substantially suppressed, and the second cathode active material particle without defects therein may be achieved. Preferably, the thermal treatment may be performed at a temperature from about 800° C. to about 1,000° C.

The second cathode active material may be mixed and stirred together with a binder, a conductive material and/or a dispersing agent in a solvent to form a second slurry. The second slurry may be coated on the first cathode active material layer 112, and dried and pressed to obtain the second cathode active material layer 114. The binder and the conductive material substantially the same as or similar to those used in the first cathode active material layer 112 may also be used.

As described above, the first cathode active material particles and the second cathode active material particles having different compositions or molar ratios may be included in different layers, so that desired properties according to layer positions may be effectively implemented.

In exemplary embodiments, the first cathode active material layer 112 contacting the cathode current collector 105 may include the lithium metal oxide having a higher nickel amount than that of the second cathode active material particle in the second cathode active material layer 114. Thus, high capacity/power may be effectively achieved from a current through the cathode current collector 105.

The second cathode active material layer 114 that may be exposed at an outer surface of the cathode 100 may include the second cathode active material particle having a relatively reduced nickel amount so that thermal stability and life-span stability may be enhanced.

As described above, the second cathode active material layer 114 may include the second cathode active material particles, each of which may have the single particle shape, so that a crack propagation caused when an external object penetrates the battery may be suppressed to block a rapid propagation of thermal energy. Thus, the second cathode active material layer 114 may serve as a cathode coating layer providing penetration stability.

The first cathode active material layer 112 may include the first cathode active material particles having the concentration non-uniformity region or the concentration gradient, and thus thermal stability and life-span stability at the surface of each particle may also be improved in the first cathode active material layer 112. Additionally, the first cathode active material particles may have a secondary particle structure in which, e.g., rod-type individual primary particles are aggregated, so that an ion mobility between the individual primary particles may be promoted, and charging/discharging rate and capacity retention may be improved.

In some embodiments, a diameter (e.g., D50 of a cumulative volumetric particle size distribution) of the second cathode active material particles may be smaller than a diameter of the first cathode active material particles. Accordingly, packing property in the second cathode active material layer 114 may be enhanced, and propagation of heat and cracks due to penetration or pressing may be more effectively suppressed or reduced.

For example, an average particle diameter of the second cathode active material particles may be about 1 to 12 μm, preferably about 1 to 10 μm, and more preferably about 2 to 8 μm. An average particle diameter of the first cathode active material particles may be about 8 to 30 μm.

In some embodiments, the first cathode active material particle and/or the second cathode active material particle may further include a doping or a coating on the surface thereof. For example, the doping or the coating may include Al, Ti, Ba, Zr, Si, B, Mg, P, W, Na, V, Cu, Zn, Ge, Ag, Ba, Nb, Ga, Cr, Sr, Y, Mo, an alloy thereof or on oxide thereof. These may be used alone or in a combination thereof. The first cathode active material particle and/or the second cathode active material particle may be passivated by the doping or the coating so that penetration stability and life-span of the battery may be further improved.

In some embodiments, a thickness of the second cathode active material layer 114 may be less than that of the first cathode active material layer 112. Accordingly, the second cathode active material layer 114 may serve as a coating layer providing a penetration barrier, and the first cathode active material layer 112 may serve as an active layer providing power/capacity.

For example, the thickness of the first cathode active material layer 112 may be in a range from about 50 μm to about 200 μm. The thickness of the second cathode active material layer 114 may be in a range from about 10 μm to about 100 μm.

In exemplary embodiments, an adhesive force of the first cathode active material layer 112 to the surface of the cathode current collector 105 may be greater than an adhesive force of the second cathode active material layer 114 to the surface of the first cathode active material layer 112.

Thus, the first cathode active material particles having a relatively high content of Ni and having a secondary particle structure may be more stably attached to the cathode current collector 112. Accordingly, generation of gas during repeated high-temperature charging and discharging may be suppressed.

In exemplary embodiments, a SPAN value in the second cathode active material layer 114 or a SPAN value of the second cathode active material particles may be greater than a SPAN value in the first cathode active material layer 112 or a SPAN value of the first cathode active material particles.

The term "SPAN" used herein may refer to a ratio of a difference between a D90 particle diameter and a D10 particle diameter relative to a D50 particle diameter as expressed by Equation 1 below.

$$SPAN = (D90 - D10)/D50 \qquad \text{[Equation 1]}$$

In Equation 1, D10, D50 and D90 are particle diameters at cumulative volume percents of 10%, 50% and 90%, respectively, in a cumulative volume particle diameter distribution of active material particles in which various particle diameters are distributed.

In exemplary embodiments, a ratio of a span value of the second cathode active material particles relative to a span value of the first cathode active material particles may be in a range from 2 to 4.5. In a preferable embodiment, the ratio of the span values may be in a range from 2 to 3.5.

In the range of the above-described span value ratio, damages or cracks in a pressing process performed during the fabrication of the electrode including the cathode active material particles may be effectively prevented. Accordingly, generation of gas from the cathode may be suppressed even though charging and discharging are repeatedly performed at high temperature, and operational stability at high temperature and life-span properties of the secondary battery may be improved.

In some embodiments, the span value of the second cathode active material particles may be in a range from 0.7 to 2, preferably from 0.9 to 1.7. The span value of the first cathode active material particles may be less than 1, preferably from 0.3 to 0.6.

In the range of the above-described span value, a porosity and a specific surface area of the cathode may be properly maintained to obtain a balance between an ion conductivity and an electrode density.

For example, the span value of the cathode active material particles may be controlled or changed by particles sizes and element content ratios of precursors (e.g., an NCM precursor), a temperature, a time or a temperature increasing rate of a heat treatment or an annealing process, etc., employed during the preparation of the active material particles.

Figure 2:
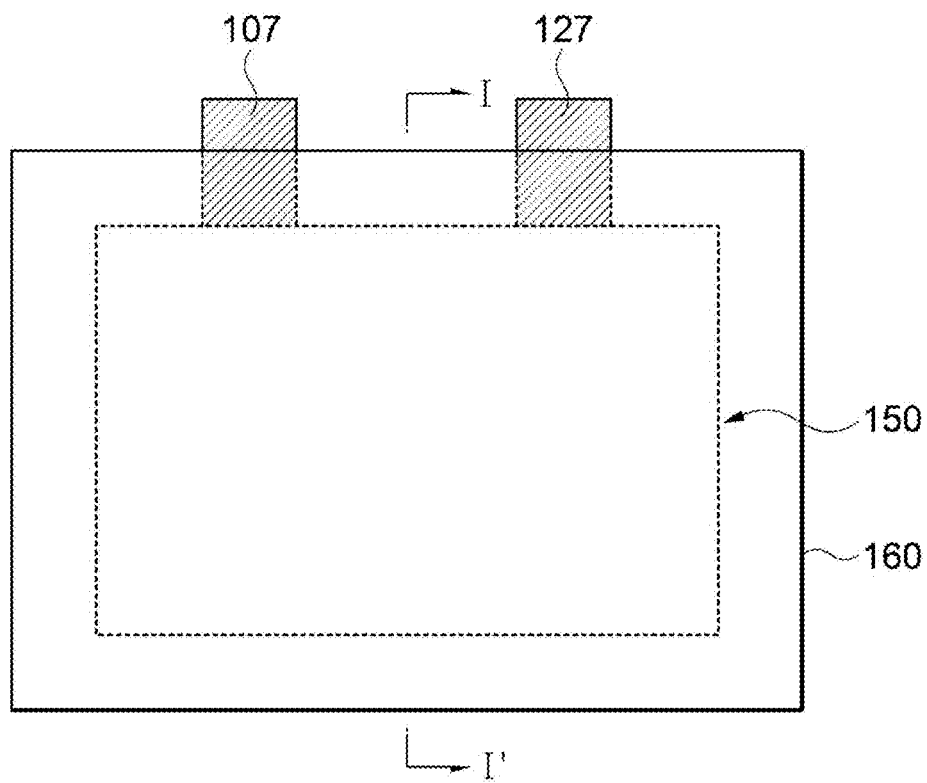
FIGS. 2 and 3 are a schematic top planar view and a schematic cross-sectional view illustrating a lithium secondary battery in accordance with exemplary embodiments.
Figure 3:
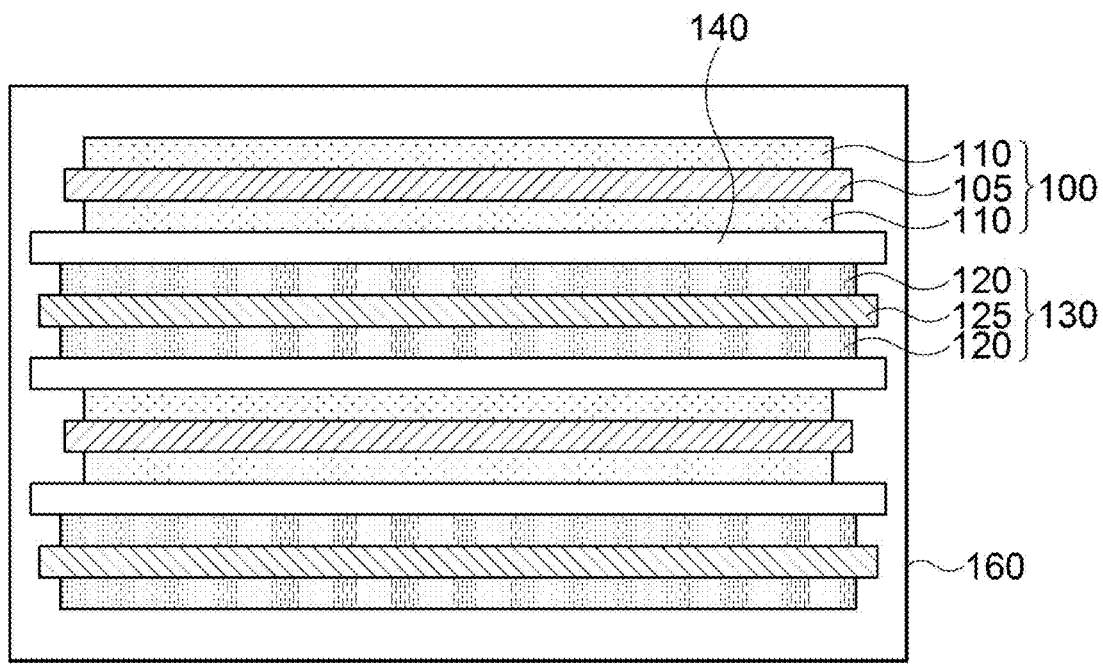

FIGS. 2 and 3 are a top planar view and a cross-sectional view, respectively, schematically illustrating a lithium secondary battery in accordance with exemplary embodiments. Specifically, FIG. 3 is a cross-sectional view taken along a line I-I' of FIG. 2 in a thickness direction of the lithium secondary battery.

Referring to FIGS. 2 and 3, a lithium secondary battery 200 may include an electrode assembly 150 housed in a case 160. The electrode assembly 150 may include the cathode 100, an anode 130 and a separation layer 140 repeatedly stacked as illustrated in FIG. 3.

The cathode 100 may include the cathode active material layer 110 coated on the cathode current collector 105. Although not illustrated in detail in FIG. 3, the cathode active material layer 110 may include a multi-layered structure including the first cathode active material layer 112 and the second cathode active material layer 114 as described with reference to FIG. 1.

The anode 130 may include an anode current collector 125 and an anode active material layer 120 formed by coating an anode active material on the anode current collector 125.

The anode active material may include a material that may be capable of adsorbing and ejecting lithium ions. For example, a carbon-based material such as a crystalline carbon, an amorphous carbon, a carbon complex or a carbon fiber, a lithium alloy, a silicon-based material, tin, etc., may be used.

The amorphous carbon may include a hard carbon, cokes, a mesocarbon microbead (MCMB), a mesophase pitch-based carbon fiber (MPCF), etc.

The crystalline carbon may include a graphite-based material such as natural graphite, artificial graphite, graphitized cokes, graphitized MCMB, graphitized MPCF, etc. The lithium alloy may further include aluminum, zinc, bismuth, cadmium, antimony, silicon, lead, tin, gallium, or indium.

The anode current collector 125 may include, e.g., gold, stainless steel, nickel, aluminum, titanium, copper or an alloy thereof, and preferably may include copper or a copper alloy.

In some embodiments, a slurry may be prepared by mixing and stirring the anode active material with a binder, a conductive material and/or a dispersing agent in a solvent. The slurry may be coated on at least one surface of the anode current collector 125, dried and pressed to obtain the anode 130.

Materials substantially the same as or similar to those used in the cathode active material layer 110 may be used as the binder and the conductive material. In some embodiments, the binder for the anode may include, e.g., an aqueous binder such as styrene-butadiene rubber (SBR) for compatibility with the carbon-based active material, and may be used with a thickener such as carboxymethyl cellulose (CMC).

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may be also formed from a non-woven fabric including a glass fiber with a high melting point, a polyethylene terephthalate fiber, or the like.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without loss by, e.g., precipitation or sedimentation. Therefore, the enhancement of power and stability by the combination of the first and second cathode active material layers 112 and 114 may be effectively implemented.

In exemplary embodiments, an electrode cell may be defined by the cathode 100, the anode 130 and the separation layer 140, and a plurality of the electrode cells may be stacked to form the electrode assembly 150 having, e.g., a jelly roll shape. For example, the electrode assembly 150 may be formed by winding, laminating or folding of the separation layer 140.

The electrode assembly 150 may be accommodated in a case 160 together with an electrolyte to form the lithium secondary battery. In exemplary embodiments, the electrolyte may include a non-aqueous electrolyte solution.

The non-aqueous electrolyte solution may include a lithium salt and an organic solvent. The lithium salt may be represented by Li$^+$X$^-$, and an anion of the lithium salt X$^-$ may include, e.g., F$^-$, Cl$^-$, Br$^-$, I$^-$, NO$_3^-$, N(CN)$_2^-$, BF$_4^-$, ClO$_4^-$, PF$_6^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, CF$_3$SO$_3^-$, CF$_3$CF$_2$SO$_3^-$, (CF$_3$SO$_2$)$_2$N$^-$, (FSO$_2$)$_2$N$^-$, CF$_3$CF$_2$(CF$_3$)$_2$CO$^-$, (CF$_3$SO$_2$)$_2$CH$^-$, (SF$_5$)$_3$C$^-$, (CF$_3$SO$_2$)$_3$C$^-$, CF$_3$(CF$_2$)$_7$SO$_3^-$, CF$_3$CO$_2^-$, CH$_3$CO$_2^-$, SCN$^-$, (CF$_3$CF$_2$SO$_2$)$_2$N$^-$, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 2, an electrode tab (a cathode tab and an anode tab) may be formed from each of the cathode current collector 105 and the anode current collector 125 to extend to one end of the case 160. The electrode tabs may be welded together with the one end of the case 160 to be connected to an electrode lead (a cathode lead 107 and an anode lead 127) exposed at an outside of the case 160.

FIG. 2 illustrates that the cathode lead 107 and the anode lead 127 protrude from an upper side of the case 160 in a planar view. However, positions of the electrode leads are not specifically limited. For example, the electrode leads may protrude from at least one of lateral sides of the case 160, or may protrude from a lower side of the case 160. Further, the cathode lead 107 and the anode lead 127 may protrude from different sides of the case 160.

The lithium secondary battery may be fabricated into a cylindrical shape using a can, a prismatic shape, a pouch shape, a coin shape, etc.

The Lithium secondary battery according to exemplary embodiments may include the cathode of the above-described structure to provide stable operational reliability at high temperature. Accordingly, the lithium secondary battery with high power and high capacity may be implemented utilizing a relatively high charging voltage. For example, stable operational reliability may be provided at a charging voltage of 4.2 V or more, preferably in a range from 4.2 V to 4.45 V.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

(1) Preparation of First Cathode Active Material Particle

Precipitates were formed by continuously changing a mixing ratio of a nickel precursor and a manganese precursor such that a total average composition was LiNi$_{0.8}$Co$_{0.1}$Mn$_{0.1}$O$_2$, compositions of a central portion and a surface portion were LiNi$_{0.802}$Co$_{0.11}$Mn$_{0.088}$O$_2$ and LiNi$_{0.77}$Co$_{0.11}$Mn$_{0.12}$O$_2$, respectively, and a concentration gradient region (decreasing Ni concentration, increasing Mn concentration) was formed between the central portion and the surface portion. After a heat treatment, the first cathode active material particles having a secondary particle structure (average diameter (D50): 13 μm) (hereinafter, that may be referred to as a particle D) were prepared.

Figure 4:
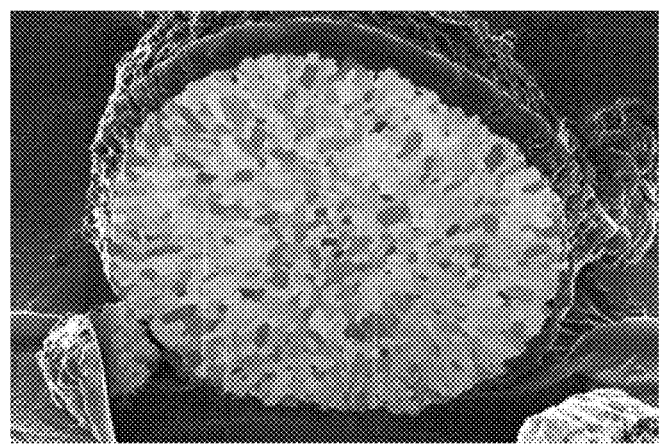
FIGS. 4 and 5 are SEM images showing a cross-section and a surface of a first cathode active material particle, respectively, prepared according to Example 1.
Figure 5:
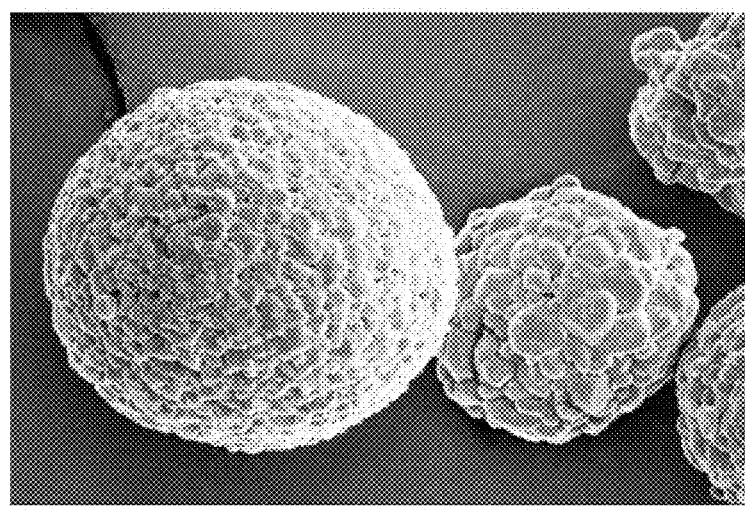

FIGS. 4 and 5 are SEM images showing a cross-section and a surface of a first cathode active material particle, respectively, prepared according to Example 1.

Referring to FIGS. 4 and 5, the first cathode active material particle had a structure where numerous primary particles were agglomerated to form a single secondary particle.

(2) Preparation of Second Cathode Active Material Particle

Ni$_{0.75}$Co$_{0.10}$Mn$_{0.15}$(OH)$_2$ as an NCM precursor and Li$_2$CO$_3$ and LiOH as a lithium source were mixed with grinding for about 20 minutes. The mixed powder was annealed at a temperature from 700° C. to 1000° C. for 15 hours, and then pulverizing, sieving and de-iron processes were performed to obtain a single particle structure (average diameter (D50): 5.7 μm) of LiNi$_{0.75}$Co$_{0.10}$Mn$_{0.15}$O$_2$ (hereinafter, that may be referred to as a particle A).

Figure 6:
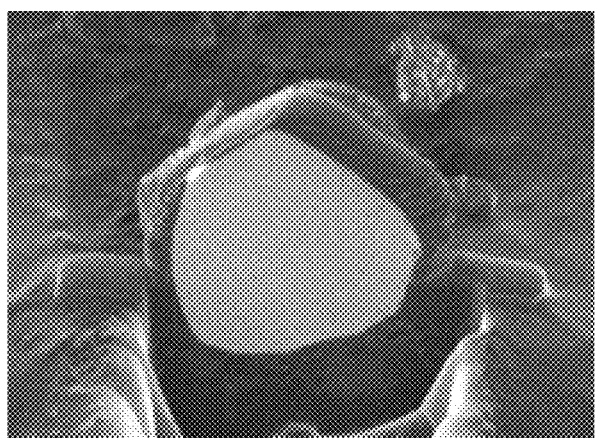
FIGS. 6 and 7 are SEM images showing a cross-section and a surface of a second cathode active material particle, respectively, prepared according to Example 1.
Figure 7:
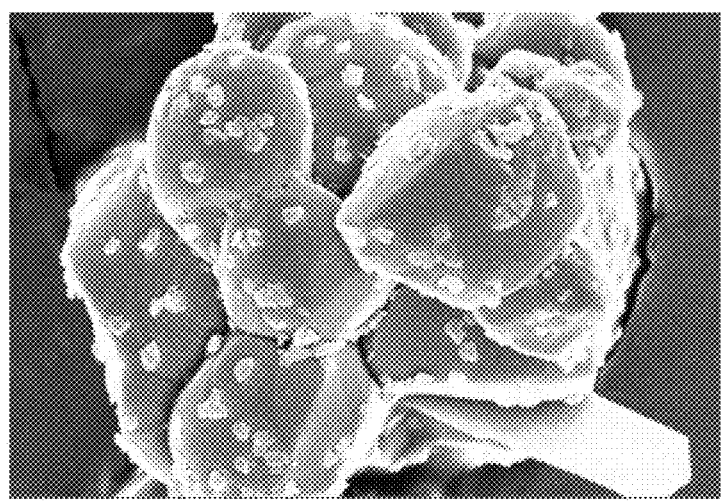

FIGS. 6 and 7 are SEM images showing a cross-section and a surface of a second cathode active material particle, respectively, prepared according to Example 1.

Referring to FIGS. 6 and 7, the second cathode active material particle was formed as a single particle shape, an inside of which was a substantially single body.

(3) Fabrication of Secondary Battery

A first cathode mixture was prepared by mixing the first cathode active material particles, Denka Black as a conductive material and PVDF as a binder in a mass ratio of 94:3:3. The first mixture was coated on an aluminum current collector, and then dried and pressed to form a first cathode active material layer.

A second cathode mixture was prepared by mixing the second cathode electrode active material particles, Denka Black as a conductive material and PVDF as a binder in a mass ratio of 95.5:3:1.5. The second cathode mixture was coated on a surface of the first cathode active material layer, and then dried and pressed to form a second cathode active material layer. Accordingly, a cathode in which the first cathode active material layer and the second cathode active material layer were sequentially stacked on the cathode current collector was obtained.

An electrode density of the first cathode active material layer was 3.7 g/cc, and a thickness of the first cathode active material layer was 57 μm. An electrode density of the second cathode active material layer was 3.7 g/cc, and a thickness of the second cathode active material layer was 30 μm.

An anode slurry was prepared by mixing 93 wt % of natural graphite as an anode active material, 5 wt % of a flake type conductive agent KS6, 1 wt % of SBR as a binder and 1 wt % of CMC as a thickener. The anode slurry was coated, dried and pressed on a copper substrate to form an anode.

The cathode and the anode obtained as described above were notched with a proper size and stacked, and a separator (polyethylene, thickness: 25 μm) was interposed between the cathode and the anode to form an electrode cell. Each tab portion of the cathode and the anode was welded. The welded cathode/separator/anode assembly was inserted in a pouch, and three sides of the pouch (e.g., except for an electrolyte injection side) were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by preparing 1M LiPF$_6$ solution in a mixed solvent of EC/EMC/DEC (25/45/30; volume ratio), and then adding 1 wt % of vinylene carbonate, 0.5 wt % of 1,3-propensultone (PRS), and 0.5 wt % of lithium bis(oxalato) borate (LiBOB).

The lithium secondary battery as fabricated above was pre-charged by applying a current (5 A) corresponding to 0.25 C for 36 minutes. After 1 hour, the battery was degassed, aged for more than 24 hours, and then a formation charging-discharging (charging condition of CC-CV 0.2 C 4.2 V 0.05 C CUT-OFF, discharging condition CC 0.2 C 2.5 V CUT-OFF) and a standard charging-discharging (charging condition of CC-CV 0.5 C 4.2V 0.05 C CUT-OFF, discharging condition CC 0.5 C 2.5V CUT-OFF) were performed.

Examples 2-6 and Comparative Examples

Lithium secondary batteries were fabricated by the same method as that in Example 1 except that cathode active materials were changed in Examples 2-6 and Comparative Examples as shown in Table 1 below.

Compositions and particle diameters of the cathode active materials are as follows:
i) particle B (single particle): $LiNi_{0.65}Co_{0.15}Mn_{0.20}O_2$, D50: 3.4 μm
ii) particle C (single particle): $LiNi_{0.83}Co_{0.12}Mn_{0.05}O_2$, D50: 7.2 μm
iii) particle E (secondary particle): $LiNi_{0.88}Co_{0.1}Mn_{0.02}O_2$ without a concentration gradient, D50: 15.8 μm
iv) particle F (secondary particle): $LiNi_{0.83}Co_{0.12}Mn_{0.05}O_2$, without a concentration gradient, D50: 4.1 μm
v) particle H (single particle): $LiNi_{0.83}Co_{0.12}Mn_{0.05}O_2$, D50: 2.8 μm
vi) particle I (single particle): $LiNi_{0.83}Co_{0.12}Mn_{0.05}O_2$, D50: 3.0 μm
vii) particle G (secondary particle): $LiNi_{0.88}Co_{0.1}Mn_{0.02}O_2$ without a concentration gradient, D50: 17.2 μm

TABLE 1

|  |  | particle shape | SPAN | SPAN ratio (2nd layer/1st layer) |
|---|---|---|---|---|
| Example 1 | 2nd layer (particle A) | single particle | 0.91 | 2.01 |
|  | 1st layer (particle D) | secondary particle | 0.45 |  |
| Example 2 | 2nd layer (particle A) | single particle | 0.91 | 2.44 |
|  | 1st layer (particle E) | secondary particle | 0.37 |  |
| Example 3 | 2nd layer (particle B) | single particle | 1.62 | 3.56 |
|  | 1st layer (particle D) | secondary particle | 0.45 |  |
| Example 4 | 2nd layer (particle B) | single particle | 1.62 | 4.33 |
|  | 1st layer (particle E) | secondary particle | 0.37 |  |
| Example 5 | 2nd layer (particle C) | single particle | 1.17 | 2.57 |
|  | 1st layer (particle D) | secondary particle | 0.45 |  |
| Example 6 | 2nd layer (particle C) | single particle | 1.17 | 3.12 |
|  | 1st layer (particle E) | secondary particle | 0.37 |  |
| Comparative Example 1 | 2nd layer (particle H) | single particle | 2.11 | 4.64 |
|  | 1st layer (particle D) | secondary particle | 0.45 |  |
| Comparative Example 2 | 2nd layer (particle H) | single particle | 2.11 | 5.64 |
|  | 1st layer (particle E) | secondary particle | 0.37 |  |
| Comparative Example 3 | 2nd layer (particle I) | single particle | 0.60 | 1.32 |
|  | 1st layer (particle D) | secondary particle | 0.45 |  |
| Comparative Example 4 | 2nd layer (particle I) | single particle | 0.60 | 1.61 |
|  | 1st layer (particle E) | secondary particle | 0.37 |  |
| Comparative Example 5 | 2nd layer (particle I) | single particle | 0.60 | 1.82 |
|  | 1st layer (particle G) | secondary particle | 0.33 |  |
| Comparative Example 6 | 2nd layer (particle F) | secondary particle | 2.22 | 4.89 |
|  | 1st layer (particle D) | secondary particle | 0.45 |  |
| Comparative Example 7 | 2nd layer (particle F) | secondary particle | 2.22 | 5.94 |
|  | 1st layer (particle E) | secondary particle | 0.37 |  |
| Comparative Example 8 | 2nd layer (particle G) | secondary particle | 0.33 | 0.72 |
|  | 1st layer (particle D) | secondary particle | 0.45 |  |
| Comparative Example 9 | 2nd layer (particle G) | secondary particle | 0.33 | 0.87 |
|  | 1st layer (particle E) | secondary particle | 0.37 |  |
| Comparative Example 10 | single-layered structure of particle D |  | — | — |

Experimental Example (1) Measurement of SPAN Value

Images of the first layer (lower layer) and the second layer (upper layer) were obtained using an SEM (Scanning Electron Microscopy) after an ion milling of the cathodes prepared according to Examples and Comparative Examples. In a magnification of ×1,000 from the obtained images, 30 particles included in an area of 25 µm (width)×25 µm (length) were selected from the second layer, and all particles from which a length could be substantially measured were selected from the first layer. Lengths of the selected particles were measured using an SEM length measurement device (FE-SEM (FEI Apreo), manufactured by Hitachi).

SPAN values of the first layer and the second layer were calculated using D10, D50 and D90 measured from each of the first layer and the second layer.

(2) Evaluation on Gas Generation

Each secondary battery of Examples and Comparative Examples was charged with SOC100% (CC-CV 1.0 C 4.2V 0.05 C CUT-OFF), and an amount of gas generated at an inside the battery cell was measured after storage at a 60° C. chamber for predetermined week intervals.

(3) Evaluation on Life-Span (Capacity Retention) Property

Charging with SOC100% (CC-CV 1.0 C 4.2V 0.05 C CUT-OFF) and discharging (CC 1.0 C 2.5V CUT-OFF) of the lithium secondary batteries of Examples and Comparative Examples were repeated 500 times in a chamber at 45° C., and then a capacity retention was measured by a percentage (%) of a discharge capacity at 500th cycle relative to a discharge capacity at 1st cycle.

The results are shown in Table 2 below.

TABLE 2

| | Gas generation after 60° C. storage | | | | Capacity Retention (45° C.) |
|---|---|---|---|---|---|
| | 0 week | 8 weeks | 12 weeks | 16 weeks | |
| Example 1 | 0 | 27 | 34 | 54 | 91% |
| Example 2 | 0 | 25 | 33 | 51 | 93% |
| Example 3 | 0 | 33 | 40 | 60 | 90% |
| Example 4 | 0 | 30 | 38 | 55 | 93% |
| Example 5 | 0 | 20 | 31 | 47 | 93% |
| Example 6 | 0 | 19 | 29 | 43 | 94% |
| Comparative Example 1 | 0 | 51 | 76 | 108 | 82% |
| Comparative Example 2 | 0 | 44 | 64 | 83 | 87% |
| Comparative Example 3 | 0 | 48 | 71 | 105 | 83% |
| Comparative Example 4 | 0 | 45 | 65 | 92 | 87% |
| Comparative Example 5 | 0 | 45 | 67 | 91 | 87% |
| Comparative Example 6 | 0 | 74 | 104 | 142 | 71% |
| Comparative Example 7 | 0 | 70 | 99 | 135 | 75% |
| Comparative Example 8 | 0 | 68 | 101 | 129 | 77% |
| Comparative Example 9 | 0 | 62 | 93 | 121 | 80% |
| Comparative Example 10 | 0 | 92 | 127 | 145 | 77% |

Referring to Table 2, in Examples having the multi-layered structure of secondary particles-single particles and having the predetermined ranges of the SPAN ratios, improved storage stability and life-span stability were provided.

What is claimed is:

1. A cathode for a lithium secondary battery, comprising:
   a cathode current collector; and
   a cathode active material layer comprising a first cathode active material layer and a second cathode active material layer sequentially stacked on the cathode current collector,
   wherein the first cathode active material layer comprises first cathode active material particles having a secondary particle structure, and the second cathode active material layer comprises second cathode active material particles having a single particle shape, and
   wherein a ratio of a SPAN value defined as Equation 1 of the second cathode active material particles relative to a SPAN value defined as Equation 1 of the first cathode active material particles is in a range from 2 to 4.5:

$$SPAN = (D90 - D10)/D50 \qquad \text{[Equation 1]}$$

wherein, in Equation 1, D10, D50 and D90 are particle diameters at cumulative volume percents of 10%, 50% and 90%, respectively, in a cumulative volume particle diameter distribution,
   wherein the SPAN value of the second cathode active material particles is in a range from 1.17 to 1.7, and the SPAN value of the first cathode active material particles is in a range from 0.3 to 0.6.

2. The cathode for a lithium secondary battery of claim 1, wherein each of the first cathode active material particles and the second cathode active material particles comprises a lithium metal oxide containing nickel, and
   wherein a content of nickel comprised in the first cathode active material particles is greater than or equal to a content of nickel comprised in the second cathode active material particles.

3. The cathode for a lithium secondary battery of claim 1, wherein each of the first cathode active material particles and the second cathode active material particles contains nickel, cobalt and manganese,
   wherein a molar ratio of nickel among nickel, cobalt and manganese in the first cathode active material particles is 0.6 or more, and
   wherein a molar ratio of nickel among nickel, cobalt and manganese in the second cathode active material particles is 0.5 or more.

4. The cathode for a lithium secondary battery of claim 3, wherein the molar ratio of nickel among nickel, cobalt and manganese in the first cathode active material particles is 0.8 or more, and
   wherein the molar ratio of nickel among nickel, cobalt and manganese in the second cathode active material particles is 0.6 or more.

5. The cathode for a lithium secondary battery of claim 3, wherein the first cathode active material particles comprise a concentration non-uniformity region of at least one element of nickel, cobalt and manganese between a central portion and a surface portion.

6. The cathode for a lithium secondary battery of claim 3, wherein each of nickel, cobalt and manganese contained in the second cathode active material particles does not form a concentration gradient.

7. The cathode for a lithium secondary battery of claim 1, wherein an average particle diameter of the second cathode active material particles is smaller than an average particle diameter of the first cathode active material particles.

8. The cathode for a lithium secondary battery of claim 1, wherein a thickness of the second cathode active material layer is smaller than a thickness of the first cathode active material layer.

9. A lithium secondary battery, comprising:
- a case; and
- an electrode assembly accommodated in the case, the electrode assembly comprising an anode and the cathode for a lithium secondary battery according to claim 1 facing the anode.

* * * * *